United States Patent [19]

Hale

[11] Patent Number: 4,713,801

[45] Date of Patent: Dec. 15, 1987

[54] RADIO-TAPE RECORDER FOR AUTOMOTIVE USE

[76] Inventor: Arthur D. Hale, 32 Portuguese Bend Rd., Rolling Hills, Calif. 90274

[21] Appl. No.: 831,318

[22] Filed: Feb. 20, 1986

[51] Int. Cl.$^4$ .............................................. G11B 31/00
[52] U.S. Cl. ......................................................... 369/7
[58] Field of Search ................... 369/7, 10, 11, 12, 29; 360/68

[56] References Cited

U.S. PATENT DOCUMENTS

| | | | |
|---|---|---|---|
| 2,557,245 | 6/1951 | Zillger | 369/7 |
| 4,149,043 | 1/1979 | Itoh | 369/10 |
| 4,388,712 | 6/1983 | Timm | |
| 4,424,538 | 1/1984 | Greene | 360/68 |
| 4,588,857 | 5/1986 | Arsem | 369/29 |

FOREIGN PATENT DOCUMENTS 0053734 6/1982 European Pat. Off. .
2256456 5/1974 Fed. Rep. of Germany .
3038935 5/1982 Fed. Rep. of Germany .

OTHER PUBLICATIONS

*Radio Shack 1984 Catalog,* 1984 Catalog Number 367, ©1983, Tandy Corporation, Fort Worth, Texas 76102.
*LRE Catalog 730,* Lafayette Radio Electronics Corporation ©1972, Syossett, L.I., NY 11791.

*Primary Examiner*—Raymond F. Cardillo
*Assistant Examiner*—James E. Tomassini
*Attorney, Agent, or Firm*—Samuels, Gauthier, Stevens & Kehoe

[57] ABSTRACT

An audio device for automotive use is disclosed in which radio transmissions can be received and directly recorded on magnetic tapes, cassettes or discs. The device includes an in-dash combination AM-FM radio receiver and tape or cassette deck which is specially adapted to permit direct recording of radio transmissions on blank tape cartridges or cassettes.

7 Claims, 2 Drawing Figures

RADIO-TAPE RECORDER FOR AUTOMOTIVE USE

BACKGROUND OF THE INVENTION

In recent years, technological advances have made it possible to reduce radio receivers and tape decks to compact sizes suitable for installation in automobile dashboards. Combination in-dash radio receivers and either cartridge or cassette tape players have become increasingly popular. In many top of the line automobile models, these combination radio-tape decks are now included as standard equipment. For most other passenger cars, these devices are available as factory-installed optional extras; or else they can be purchased from other audio manufacturers and installed by the owner or by an audio specialty shop.

These combination radio-tape decks typically permit a driver or a passenger while travelling in the car to quickly and easily switch between AM and FM radio reception as well as between the radio reception mode and playing a pre-recorded cartridge or cassette on the tape player. Often it would also be desirable, however, for the driver or passenger to also be able to directly record news, music or other radio transmissions on a blank cartridge or cassette. For many years, the technology has been available for directly coupling a radio receiver to a tape recorder, and numerous portable models of such combination devices are on the market. Noone, however, has devised an adaptation of these radio-tape recorders-tape players suitable for in-dash installation in an automobile or similar passenger vehicle.

For example, U.S. Pat. Nos. 3,916,122; 4,109,115; and 4,396,941 all show combination radio receivers, tape recorders and tape players. Each of these patents is directed to a compact and portable combination device which permits the user to choose between AM and FM radio reception, or playing a pre-recorded cartridge or cassette. In addition, the user can elect the use the device to record AM or FM radio transmissions directly onto a blank cartridge or cassette. The latter mode permits the user to hear the radio transmission, if he so desires, simultaneously with recording that transmission.

None of these devices, however, is suitable for in-dash installation in an automobile. Although these devices are compact enough to be easily portable, they are still too large for an automobile dashboard. The controls, the frequency indicators and the cartridge/cassette chambers for each of the devices are located on at least two if not on three faces of the device, which would render at least some of the controls or the indicators or the chambers inaccessible after installation in an automobile dashboard. The antennas attached to these prior art devices would protrude so as to create an interference as well as a hazard to the driver or passenger of an automobile; and, in any event, these autennas would not provide adequate reception for purposes of quality recording inside an automobile.

U.S. Pat. Nos. 4,149,043 and 4,388,712 do show radio receivers specially adapted for in-dash mounting in the dashboard of an automobile. In both of these patents, the radio receivers are combined with tape decks, as discussed above, so that a driver or passenger travelling in a car can choose between listening to the radio or playing a pre-recorded cartridge or cassette. Each of these patents refers to the tape portion of the device as a "tape recorder."

A closer inspection of these patents shows, however, that no provision is made in either one for using the device to record radio transmissions. Indeed, as the introductory portion of U.S. Pat. No. 4,149,043 notes, in conventional automobile radio/tape player systems it would be impossible to record radio transmissions because of the "selective operations" design of these systems. Namely, in these systems, a power source is connected to the radio with a moveable contact switch such that when a cassette is inserted into a slot on the tape player, the switch is changed over to supply power to the tape player instead of to the radio. When a push-button control is used to eject the cassette from the tape player, the moveable switch is moved back into its original position thus supplying power to the radio but not to the tape player. There is, accordingly, no way that these conventional systems can be used to record radio transmissions: when the radio is on, the tape player is off and vice versa.

The invention of U.S. Pat. No. 4,149,043 does not remedy this deficiency. The improvement which is the subject of this patent consists of a modification in the conventional systems such that a driver can switch from the radio mode to the tape player mode and back without having to alternately insert and eject a cassette or cartridge. The device described in the '043 patent utilizes a movable switch connected to the radio and to a temporary stopping mechanism in the tape player. Through one simple control, for example a lever or push/button, the driver can disconnect the radio and engage the tape player so as to play a pre-recorded cassette or cartridge previously inserted into the tape player. Using the same control, the driver can switch the power back to the radio thereby stopping the tape player, and the cassette or cartridge in play, without ejecting the cassette or cartridge. While this device may greatly facilitate switching between the radio and tape player modes, there is still no provision for simultaneously supplying power to both the radio and the tape player so as to permit the recording of radio transmissions.

The disclosures of U.S. Pat. Nos. 3,916,122; 4,109,115; 4,149,043; 4,388,712; and 4,396,941, as discussed above, are incorporated herein by reference.

SUMMARY OF THE INVENTION

The object of this invention is to provide a compact combination radio receiver, tape player and tape recorder suitable for in-dash installation in an automobile or similar passenger vehicle.

More specifically, it is an object of this invention to provide an in-dash mounted audio device by which a driver or passenger travelling in a car can directly record radio transmissions on a blank cartridge or cassette of magnetic tape.

It is a further object of this invention to provide an audio device by which a driver or passenger travelling in a car can directly record radio transmissions while continuing to listen to the radio broadcast.

Still another object of this invention is to provide an audio device for automobile use by which a driver can readily switch from a radio receiving mode to simultaneously receiving and recording a radio transmission and back to the radio receiving mode.

DETAILED DESCRIPTION OF THE DRAWINGS

Figure 1:
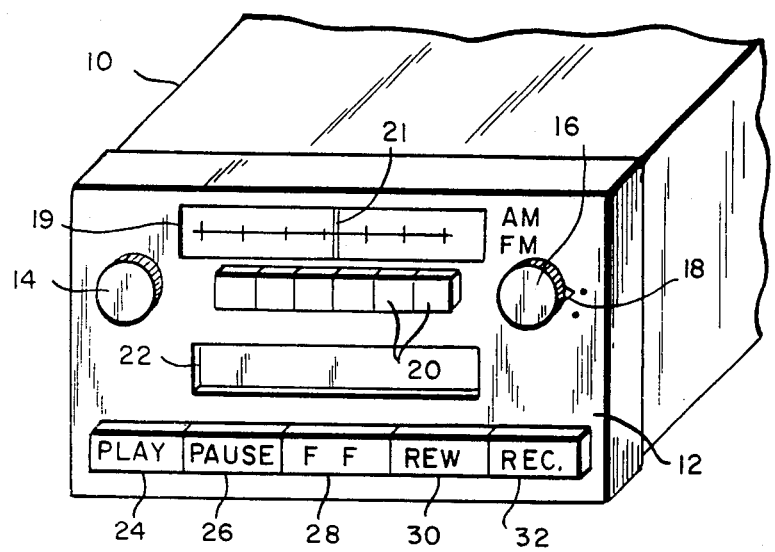
FIG. 1 is a perspective view of a combination AM-FM radio and tape player/recorder according to this invention.

FIG. 1 shows one embodiment of an in-dash mountable AM-FM radio and tape player/recorder according to this invention. The device includes a generally rectangular housing 10 fabricated from metal or plastic which houses the internal electronic components of the radio and tape player/recorder. The controls for the radio and tape player/recorder, the slot for receiving a cartridge or cassette, and the station selector display (all as described below) are all positioned on one forward face 12 of said rectangular housing. Means for electrically engaging the device to the automobile electrical system are positioned on a different face of the housing. In a preferred embodiment, the electrical engagement means comprises wire or socket means (not shown) located along the back face of the rectangular housing opposite forward face 12. Means for engaging an antenna to improve radio reception, for example a lead wire, may also be positioned along said back face of the rectangular housing.

The controls include an On/Off knob 14 for controlling the power supply. Knob 14 also controls the volume of sound when either the radio or the tape player is on. Knob 14 may be of the pull-push-turn variety or else both power and volume of sound can be controlled by turning the knob clockwise to turn on power and increase volume and counterclockwise to reduce volume and turn off power. Both types of controls are conventional and wellknown in the art.

The controls also include a radio frequency adjustment knob 16 used to adjust AM and FM radio reception. A lever 18 on the side of knob 16 is used to select AM or FM reception. When lever 18 is in the "up" position (as shown in FIG. 1), the radio will be turned for AM reception. When lever 18 is flipped into the "down" position (not shown), the radio will be turned to receive FM transmissions. By turning knob 16 clockwise or counterclockwise, the radio can be tuned to receive radio transmissions across the entire AM and FM commercial frequency bands. A station selector display 19 shows the range of AM and FM radio frequencies, and an indicator bar 21 shows the frequency adjustment. Optionally, selector display 19 may be internally lighted for greater ease of reading. In another embodiment, a digital frequency display may be substituted for display 19.

Optionally, the radio receiver of this invention may also include a plurality of push-button radio frequency adjustors 20 which can be pre-set to automatically tune the radio, upon pushing the appropriate button, to a certain desired reception frequency. All of the above-described frequency control features, and many variations thereof, are also conventional in the art and thus require no further elaboration.

Forward face 12 of this device further includes a slot 22 of suitable size for inserting a magnetic tape cartridge or cassette. In the preferred embodiment, slot 22 is designed to accommodate conventionally sized tape cassettes which have a playing or recording time ranging from 15–45 minutes per side. It is contemplated, however, that this device can be designed and adapted to play or record tape cartridges, micro-sized cassettes, and compact laser discs. The face of slot 22 may optionally be equipped with flexible rubber or plastic dust covers to help keep foreign objects out of the internal mechanism. By inserting a tape cassette into slot 22 in the correct orientation (which may be either forward or sideways depending on the internal construction), the tape becomes ready to be operatively connected to either the tape player or tape recorder of this invention, Forward face 12 of this device also includes a set of push-button function selector controls for the tape player/recorder of this invention. At a minimum, these controls should include a Play button 24, a Pause button 26, and a Record button 32. Optionally, these controls may also include a Fast Forward button 28 and a Rewind button 30.

A key distinguishing feature of this invention as contrasted with prior art automobile in-dash radio/tape players is that until one of the function selector control buttons is pushed, a tape cassette inserted into slot 22 is not operatively engaged by the tape player/recorder mechanism. In order to switch from the radio-playing mode to playing a pre-recorded tape cassette with this invention, the automobile driver or a passenger first properly inserts the cassette into slot 22. Then he depresses the Play button 24. Pushing Play button 24 simultaneously disengages the power source from the radio receiver and engages the power source to the tape player mechanism as further illustrated in FIG. 2.

To return to the radio-playing mode of operation, the driver or passenger simply pushes the Pause button 26. One push of the Pause button disengages the power source from the tape player and simultaneously reconnects it to the radio receiver. The cassette, however, remains inside slot 22 so that merely pushing the Play button 24 converts the device back to the tape-playing mode. On the other hand, by pushing the Pause button a second time in a row, the cassette is ejected from slot 22 necessitating reinsertion of the cassette to return to tape playing.

In order to use the device of this invention for recording radio receptions, the automobile driver or a passenger first properly inserts a blank tape cassette (or a pre-recorded cassette which is capable of being simultaneously erased and re-recorded) into slot 22. Then he depresses the Record button 32. Pushing Record button 32 engages the power source simultaneously to both the radio receiver and the tape player/recorder mechanism, as further illustrated in FIG. 2. This control permits simultaneous activation of the radio and tape recorder in such a way that radio signals are received, amplified for transmission through the automobile speakers, and at the same time are amplified for recording on the tape cassette. This unique feature of this invention makes it possible for an automobile driver who suddenly hears a song, news broadcast, or other radio programming that he wishes to record to do so simply by pushing one button with only a momentary interference with reception of the broadcast. The interference would last no longer than the very brief time required for switching the electrical contacts as shown in FIG. 2.

To return to the radio-playing mode of operation after a desired radio broadcast has been recorded, the driver or passenger simply pushes the Pause button 26. One push of the Pause button disengages the power source from the electrical contact which serves both the radio receiver and the tape player/recorder and simultaneously reconnects it to the electrical contact which serves only the radio receiver. The cassette, however, remains positioned inside slot 22 so that merely pushing the Record button 32 converts the device back to the recording mode for recording another radio broadcast. On the other hand, by pushing the Pause button a second time in a row, the cassette is ejected from slot 22. At this point, another blank cassette may be inserted into slot 22 or else a prerecorded cassette can be inserted for playing.

Many variations on this device will be readily apparent to those skilled in the art, and all such variations and modifications are intended to be encompassed by this invention. For example, as noted above, the tape player/recorder of this invention may include a Fast Forward function selector button 28 and a Rewind function selector button 30. These controls would facilitate a driver or passenger replaying a song or other radio broadcast which had just been recorded. The tape player/recorder may also optionally be equipped with a digital tape location selector to facilitate finding a particular portion of a prerecorded cassette. It is contemplated that the tape player/recorder of this invention may also include a microphone jack or plug designed to accommodate a hand-held microphone for purposes of recording dictation while in transit. These are all conventional and well-known features of tape players/recorders which can be readily adapted to this invention.

Figure 2:
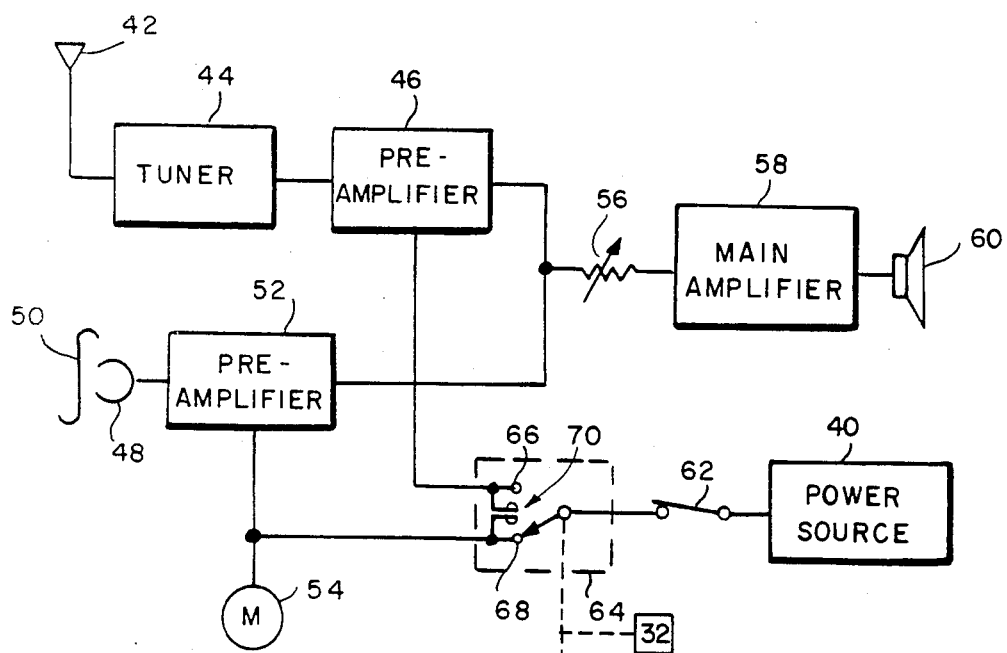
FIG. 2 is a simplified block circuitry diagram illustrating the essential internal circuitry components of this invention.

FIG. 2 is a block circuitry diagram showing the essential internal electrical components of this invention. Also shown in FIG. 2 is an external power source 40 and an antenna 42. The power source 40 for this device will typically be the automobile battery. It is also envisioned, however, that the radio-tape player/recorder can be powered by its own internally-contained battery. Antenna 42 may either be of the external variety which protrudes from the hood or body of the automobile or it may be embedded in the automobile windshield.

More specifically, FIG. 2 shows the following component parts of the audio system of this invention: (A) a radio reception system comprising an antenna 42, a radio tuner 44, and a radio signal preamplifier 46; (B) a tape player/recorder system comprising a magnetic head 48 for picking up audio signals from or transmitting audio signals to a magnetic tape 50, another preamplifier 52, and a motor drive 54; (C) an audio output system comprising a variable resistor 56 for controlling the level of audio signals, a main amplifier 58, and one or more speakers 60; and (D) a power supply system comprising a power source 40, a main switch 62, and a three-way slide switch 64 having electrical contact positions 66, 68 and 70.

Contact position 66 electrically engages the power supply only to the radio reception system and the audio output system. Contact position 68 electrically engages the power supply only to the tape player/recorder system and the audio output system. Referring back to FIG. 1, pushing the Play button, function selector button 24, results in shifting the slide switch selector contact from contact position 66 to position 68, thereby activating the tape player system. In this mode of operation, magnetic head 48 will be activated so as to pick up audio signals from the magnetic tape. Pushing the Pause button, function selector button 26, results in shifting the slide switch selector contact back to position 66, thereby restoring radio reception. Similarly, contact position 70 electrically engages the power supply simultaneously to the radio reception system, the tape player/recorder system, and the audio output system. Referring again to FIG. 1, pushing the Record button, function selector button 32, results in shifting the slide switch selector contact from contact position 66 to position 70 thereby simultaneously activating the radio and the tape player/recorder systems with substantially uninterrupted radio reception. In this mode of operation, however, magnetic head 48 will be activated so as to transmit audio signals from the radio receiver to the magnetic tape. Pushing the Pause button results in shifting the slide switch selector contact back to position 66, thereby continuing substantially uninterrupted radio reception but terminating the tape recording function.

Accordingly, this invention provides an easy and convenient method for an automobile driver while in transit to selectively record portions of radio broadcasts without interrupting the radio reception or interfering with his driving.

Having described my invention, what I claim is:

1. An in-dash mountable audio apparatus having a housing with a front face, said housing containing the following electrical systems;
    (A) a radio reception system comprising an antenna, a radio tuner, and a radio signal preamplifier;
    (B) a tape player and recorder system comprising a magnetic head, a motor drive, and a preamplifier;
    (C) an audio output system comprising a variable resistor, a main amplifier, and at least one speaker; and,
    (D) a power supply system comprising a power source, a main switch and a three-way switch having three electrical contact positions wherein: the first of said contact positions electrically engages the power supply only to the radio reception system and the audio output system; the second of said contact positions electrically engages the power supply only to the tape player and recorder system and the audio output system; and the third of said contact positions electrically engages the power supply simultaneously to the radio reception system, the tape player and recorder system, and the audio output system; and first, second and third manually-actuated controls accessible at said front face, said controls being separately and alternately operable to adjust said three-way switch respectively to one of the first, second and third of said contact positions.

2. The audio apparatus of claim 1 wherein said first second and third manually - activated controls are push buttons positioned on an external face of said apparatus.

3. The audio apparatus of claim 1 including rectangular housing means enclosing said electrical systems and further including power control means, volume control means, AM/FM band selector means, station selector display means, radio frequency adjustment means, cassette slot means, and function selector means in which all of said first, second and third manually-actuated controls are positioned on a single external face of said housing means.

4. The audio apparatus of claim 1 additionally including antenna means electrically connected to said radio reception system.

5. The audio apparatus of claim 1 additionally including Fast Forward and Rewind push button function selector controls.

6. The audio apparatus of claim 1 additionally including microphone engagement means for recording dictations.

7. The audio apparatus of claim 3 additionally including push button radio frequency adjustment means.

* * * * *